(12) United States Patent
Ellmauthaler et al.

(10) Patent No.: US 11,906,682 B2
(45) Date of Patent: Feb. 20, 2024

(54) RETRIEVABLE FIBER OPTIC VERTICAL SEISMIC PROFILING DATA ACQUISITION SYSTEM WITH INTEGRATED LOGGING TOOL FOR GEOPHONE-EQUIVALENT DEPTH ACCURACY

(71) Applicant: Halliburton Energy Services, Inc., Houston, TX (US)

(72) Inventors: Andreas Ellmauthaler, Houston, TX (US); Simon Shaw, Youngsville, LA (US); Michel Joseph LeBlanc, Houston, TX (US); Mark Elliott Willis, Katy, TX (US); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 283 days.

(21) Appl. No.: 17/608,045

(22) PCT Filed: Jun. 11, 2019

(86) PCT No.: PCT/US2019/036550
§ 371 (c)(1),
(2) Date: Nov. 1, 2021

(87) PCT Pub. No.: WO2020/251554
PCT Pub. Date: Dec. 17, 2020

(65) Prior Publication Data
US 2022/0214468 A1    Jul. 7, 2022

(51) Int. Cl.
*G01V 1/46* (2006.01)
*G01V 1/22* (2006.01)
(Continued)

(52) U.S. Cl.
CPC ............ *G01V 1/46* (2013.01); *G01V 1/226* (2013.01); *G01V 1/50* (2013.01); *G01V 1/52* (2013.01);
(Continued)

(58) Field of Classification Search
CPC .......... G01V 1/50; G01V 11/002; G01V 8/24; G01V 1/226; G01V 1/46; G01V 1/52;
(Continued)

(56) References Cited

U.S. PATENT DOCUMENTS

| 10,281,606 B2 * | 5/2019 | Erdemir ................... G01V 1/48 |
| 11,555,939 B2 * | 1/2023 | Wilson .................... G01V 1/362 |
| 2007/0131418 A1 | 6/2007 | Barrow et al. |
| 2009/0326826 A1 * | 12/2009 | Hull ...................... E21B 47/135 |
| | | 702/12 |

(Continued)

FOREIGN PATENT DOCUMENTS

WO    2020251554 A1    12/2020

*Primary Examiner* — Daniel L Murphy
*Assistant Examiner* — Amie M Ndure
(74) *Attorney, Agent, or Firm* — John Wustenberg; Parker Justiss, P.C.

(57) ABSTRACT

A wellbore system includes a logging unit having a retrievable logging cable coupled to a downhole tool within a wellbore and a depth correlation unit in the downhole tool that provides current depth data for the wellbore through the retrievable logging cable for recording of a current depth by the logging unit. The wellbore system also includes a distributed acoustic sensing unit that includes a seismic processing unit and a seismic profiling unit connected to a separate optical cable of the retrievable logging cable having distributed acoustic sensing channels, wherein an assignment of the distributed acoustic sensing channels along the separate optical cable is determined by an offset distance between the current depth of a formation reference region within the wellbore and a previous reference depth of the formation reference region within the wellbore. A distributed acoustic sensing method is also included.

20 Claims, 9 Drawing Sheets

(51) Int. Cl.
*G01V 1/50* (2006.01)
*G01V 8/24* (2006.01)
*G01V 1/52* (2006.01)

(52) U.S. Cl.
CPC ........ *G01V 8/24* (2013.01); *G01V 2210/6169* (2013.01); *G01V 2210/72* (2013.01)

(58) Field of Classification Search
CPC ....... G01V 2210/6169; G01V 2210/72; G01V 1/40; G01V 1/28; G01V 1/22; G01V 1/24; G01V 1/02; G01V 1/16; G01V 1/003; G01V 1/00; G01V 3/18; E21B 47/107; E21B 47/16; E21B 47/14; G01P 5/241
USPC .......................................................... 367/25
See application file for complete search history.

(56) References Cited

U.S. PATENT DOCUMENTS

| | | | |
|---|---|---|---|
| 2010/0230105 A1* | 9/2010 | Vaynshteyn | E21B 47/04 166/55 |
| 2011/0188346 A1* | 8/2011 | Hull | E21B 47/107 367/35 |
| 2013/0167628 A1* | 7/2013 | Hull | G01V 1/001 73/152.58 |
| 2014/0036627 A1* | 2/2014 | Hull | G01N 29/14 367/27 |
| 2015/0034306 A1* | 2/2015 | Hull | E21B 47/04 166/250.01 |
| 2017/0159423 A1* | 6/2017 | Merino | E21B 47/12 |
| 2018/0329099 A1* | 11/2018 | Erdimer | G01H 9/004 |
| 2019/0004195 A1 | 1/2019 | Hornman et al. | |
| 2020/0072993 A1* | 3/2020 | Wilson | G01V 1/46 |
| 2020/0271811 A1* | 8/2020 | Wilson | G01V 1/52 |
| 2021/0199832 A1* | 7/2021 | Wu | E21B 47/135 |
| 2022/0214468 A1 | 7/2022 | Ellmauthaler et al. | |

* cited by examiner

RETRIEVABLE FIBER OPTIC VERTICAL SEISMIC PROFILING DATA ACQUISITION SYSTEM WITH INTEGRATED LOGGING TOOL FOR GEOPHONE-EQUIVALENT DEPTH ACCURACY

CROSS-REFERENCE TO RELATED APPLICATION

This application is the National Stage of, and therefore claims the benefit of, International Application No. PCT/US2019/036550 filed on Jun. 11, 2019, entitled "RETRIEVABLE FIBER OPTIC VERTICAL SEISMIC PROFILING DATA ACQUISITION SYSTEM WITH INTEGRATED LOGGING TOOL FOR GEOPHONE-EQUIVALENT DEPTH ACCURACY," which was published in English under International Publication Number WO 2020/251554 on Dec. 17, 2020. The above application is commonly assigned with this National Stage application and is incorporated herein by reference in its entirety.

TECHNICAL FIELD

This application is directed, in general, to monitoring of hydrocarbon wellbores and, more specifically, to a system and method for improvement in vertical seismic profiling of hydrocarbon wellbores.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require and utilize measurements and other sensed data to determine characteristics of the formation, the hydrocarbon or the equipment used in the operation, for example.

One example type of sensed data comprises seismic data in the form of a vertical seismic profile (VSP). The vertical seismic profile may refer to the measurement of seismic or acoustic energy in a wellbore originating from a seismic source at the surface of the wellbore (e.g., a vibrator truck, air gun, or explosives). In certain instances distributed acoustic sensing (DAS) may be used to acquire the seismic data necessary to form the vertical seismic profile. Acoustic sensing based on distributed acoustic sensing may use the Rayleigh backscatter property of a fiber's optical core and may spatially detect disturbances that are distributed along a length of fiber positioned within a wellbore. Distributed acoustic sensing data may, however, suffer from noise artifacts that can reduce the accuracy of the seismic data and any calculations performed using the seismic data.

BRIEF DESCRIPTION

Reference is now made to the following descriptions taken in conjunction with the accompanying drawings, in which.

DETAILED DESCRIPTION

Figure 1:
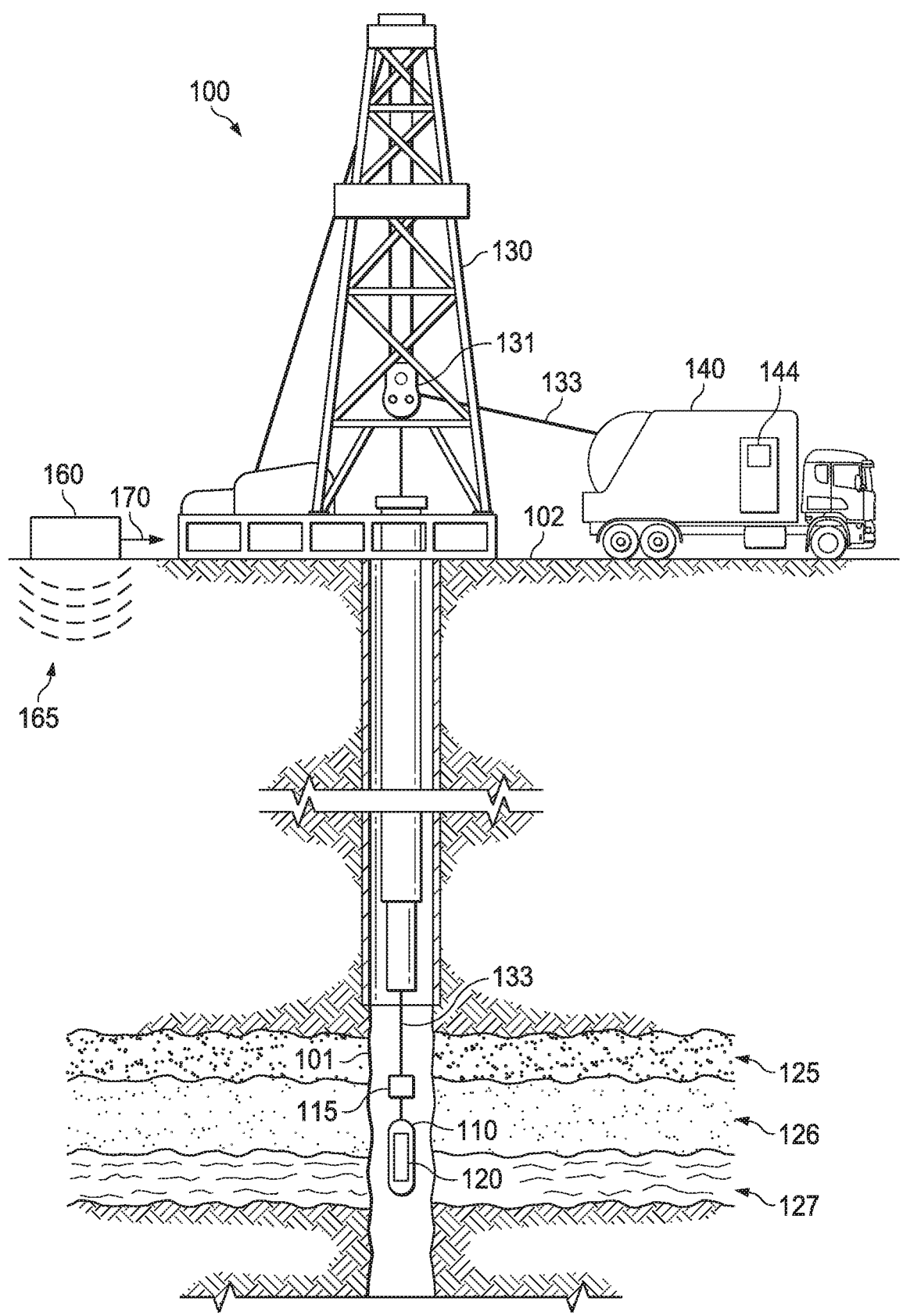
FIG. 1 illustrates a wellbore system configured to perform subterranean formation data sampling and testing.

This disclosure generally relates to monitoring of hydrocarbon wellbores. In particular, this disclosure relates to a system and method for monitoring a wellbore using distributed acoustic sensing (DAS) with improved accuracy.

When performing subterranean operations, acoustic sensing may be used to measure many important properties and conditions of a wellbore, pipeline, other conduit or tube, or of fluids used. For example, when performing subterranean operations, it may be desirable to monitor a number of properties related to the subterranean formation or conduits used downhole, including, but not limited to, pressure, temperature, porosity, density, and subterranean bed thickness. Further, certain properties of fluids used in conjunction with performance of subterranean operations, such as pressure, temperature, density, viscosity, and the content of oil, water or gas, may also be important measurements. In addition, downhole-logging tools based on sonic well logging systems may be used to measure downhole properties such as formation porosity, location of bed boundaries and fluid interfaces, well casing condition, and behind casing cement location and bonding quality. Monitoring properties and conditions over time may have significant value during exploration and production activities. Furthermore, borehole seismic tools incorporating geophones and/or accelerometers can be deployed to measure vibrations caused by seismic energy that reach the borehole at various depths.

Distributed acoustic sensing may be capable of producing the functional equivalent of 10 s, 100 s, or even 1000 s of acoustic sensors or seismic sensors. Properties of downhole formations surrounding or otherwise adjacent to a wellbore may be monitored over time based on the acoustic sensing. Further, hydrocarbon production may be controlled, or reservoirs may be managed based on the downhole formation properties sensed by in-well acoustic measurement methods using a distributed acoustic sensing unit.

Acoustic sensing based on distributed acoustic sensing may use the Rayleigh backscatter property of a fiber's optical core and may spatially detect disturbances that are distributed along the fiber length. Such systems may rely on detecting phase changes brought about by changes in strain along the fiber's core. Externally-generated acoustic disturbances may create very small strain changes in optical fibers. Distributed fiber optic sensing produces data that is associated with an array of positions along an optical fiber. It is important for the user of this data to be able to correlate position along the fiber with depth in the wellbore. However, the mapping of wellbore depth to fiber position is made difficult by many factors. One factor is the temperature-dependence of the fiber index of refraction. Another factor is stretch along the wireline cable incorporating the fiber cable, such stretch being a function of the on tool weight, the density of the wellbore fluids, and the temperature profile in the wellbore. The shape of the wellbore is also important because it determines where the wireline cable may be touching the inner wall of the well. There is may be friction on the wireline where it touches the inner wall of the wellbore and this affects the loads seen by the different sections of cable and hence affects the strain profile along the wireline cable. Furthermore, permanent plastic deformation also may occur, and this depends not only on the current loads applied to the wireline but on the full load history of the cable, including all previous runs in the same well or in previous wells. Examples provided in the disclosure overcome many current inaccuracies and thereby improve wellbore data quality.

FIG. 1 illustrates a wellbore system, generally designated 100, configured to perform subterranean formation data sampling and testing. After drilling of a wellbore 101 from a surface location 102 is complete, it is usually desirable to know additional details about types of formation fluids and their associated characteristics through data sampling and collection employing formation logging. The wellbore system 100 includes a downhole measurement tool 110 having a depth correlation unit 120 that forms part of a logging operation that can be used for accurate depth control. The downhole measurement tool is attached to the logging cable 133 by an interface 115 which may be a connector, a wireline cable head, or other means of mechanically, electrically and/or optically coupling measurement tool 110 to logging cable 133. A depth correlation unit is a tool that provides measurements that can uniquely be associated with true depth inside a wellbore. The depth correlation unit 120 can be, for example, a gamma ray logging sensor unit or a casing collar locator. Interface 115 may include extra length of fiber, for example loosely wrapped in a coil and contained in a pressure housing, to permit the DAS system to acquire data from the fiber cable all the way to the end of logging cable 133 without running into end effects, such as a blanked off signal due to a strong reflection at the fiber end. Furthermore, a load sensor attached to logging cable 133 between interface 115 and downhole measurement tool 110 may be present to further aid in determination of the depth profile along logging cable 133 as will be discussed further below in this disclosure.

The wellbore system 100 also includes a derrick 130 that supports a traveling block 131 and the downhole measurement tool 110 in the form of a sonde or probe that is lowered by a retrievable logging cable 133 into the wellbore 101. The retrievable logging cable 133 may be a wireline, a slickline, a coiled tubing or other cable or conveyance suitable for a logging operation. Generally, any retrievable fiber optic cable conveyance that allows for the operation of a logging tool that provides depth control can be employed. The downhole measurement tool 110 may be lowered to the bottom of a region of interest in the wellbore 101 and pulled upward at a substantially constant speed to gain logging information for wellbore structures such as subterranean formations 125, 126 and 127. The downhole measurement tool 110 may be configured to measure fluid properties of wellbore or formation fluids and other measurement data generated by the downhole measurement tool 110 and then communicate it to a logging unit (i.e., a surface logging facility) 140 for storage, processing or analysis via the retrievable logging cable 133. The logging unit 140 is provided with electronic equipment 144, including electronic and optical processors and data storage for various types of signal processing. The depth correlation unit 120 in the downhole measurement tool 110 provides current depth data from the wellbore 101 through the retrievable logging cable 133 for recording of a current depth data in the logging unit 140.

The wellbore system 100 additionally includes a seismic energy source 160 that provides seismic energy 165 to the earth near the wellbore 101 over a swept seismic frequency range (e.g., a 20 seconds long frequency chirp with linearly increasing frequency ranging from five to one hundred Hertz) that is employed to provide vertical seismic profiling for subterranean formations proximate to or intercepting the wellbore 101. Additionally, the seismic energy source 160 provides the swept seismic frequency to the electronic equipment 144 through a wired or wireless connection 170 to accommodate wellbore seismic processing and profiling. Other seismic sources include dynamite, weight drops and airguns, among others, which emit an impulsive seismic signal into the subterranean formation. These subterranean formations include formations 125, 126 and 127, which consist of shale and non-shale strata. The shale formation strata generally supply gamma ray data that are captured by the depth correlation unit 120 to provide a gamma ray profile or "a formation signature" for the region logged. This gamma ray formation signature may be correlated, recognized and identified between successive logging runs.

Generally, the retrievable logging cable 133 is a retrievable fiber optic and electrical logging cable that is capable of conveying or conducting both optical and electrical signals between the wireline tool 110 (e.g., the depth correlation unit 120) and the logging unit 140. Additionally, the retrievable logging cable 133 includes an optical cable that forms a portion of a distributed acoustic sensing unit otherwise contained in the electronic equipment 144, in this example. The distributed acoustic sensing unit employs distributed acoustic sensing channels along the optical cable whose positions are more accurately determined by knowing an offset distance difference between a current depth of a formation reference region within the wellbore 101 and a previous reference depth of the formation reference region within the wellbore 101. This distributed acoustic sensing channel determination and placement provides a more accurate vertical seismic profiling of the wellbore 101. Examples of the distributed acoustic sensing unit additionally include a fiber stretcher module and a distributed acoustic sensing interrogator along with additional processing and control circuitry. The fiber stretcher module either may be located inside of the distributed sensing interrogator or may be an external module that is placed in between the distributed acoustic sensing interrogator and the retrievable logging cable. The fiber stretcher unit contains optical fiber that is serially in line with the downhole sensing fiber and is interrogated by the same distributed sensing interrogator as the downhole sensing fiber.

Figure 2:
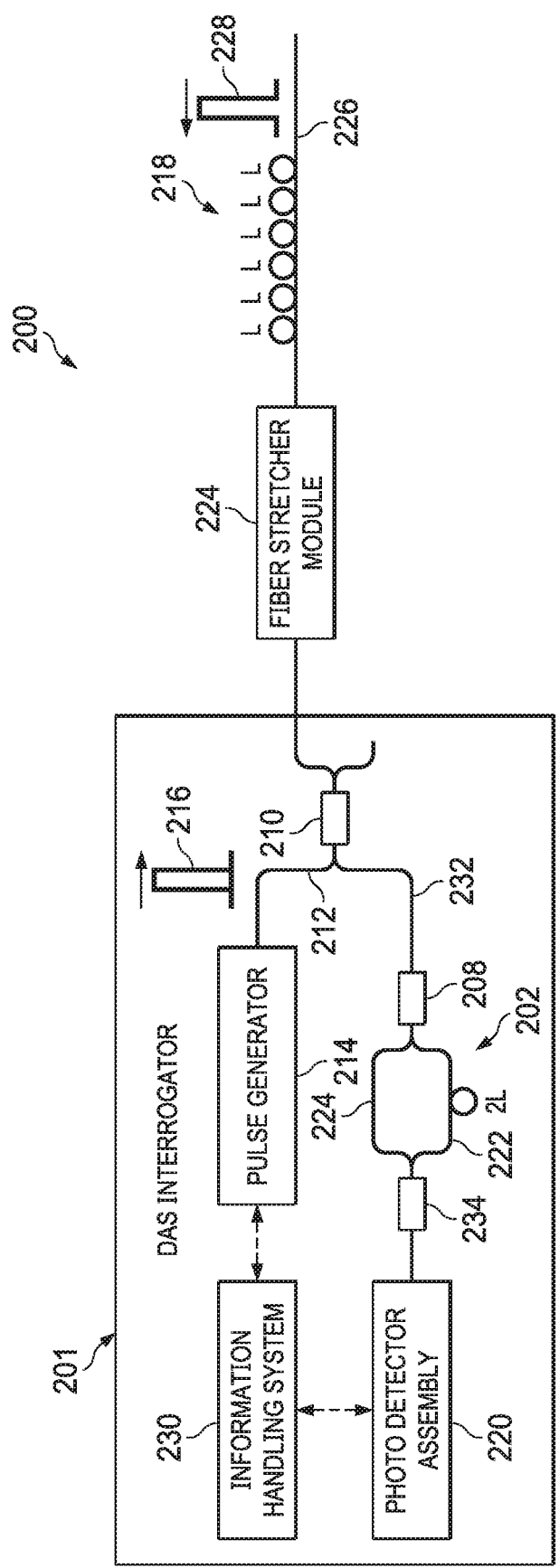
FIG. 2 illustrates a distributed acoustic sensing (DAS) unit as may be employed for performing distributed acoustic sensing within a wellbore such as the wellbore in FIG. 1.

FIG. 2 illustrates a distributed acoustic sensing (DAS) unit, generally designated 200, as may be employed for performing distributed acoustic sensing within a wellbore such as the wellbore 101. The DAS unit 200 includes a DAS interrogator 201, a fiber stretcher module 224 that may or may not be housed inside the DAS interrogator 201 and a distributed optical wellbore fiber 226 within a retrievable logging cable such as the retrievable logging cable 133 of FIG. 1. The DAS unit 200 may therefore be incorporated into a wellbore logging system, such as the wellbore system 100. The DAS interrogator 201 may be a coherent Rayleigh scattering system with a compensating interferometer, as indicated, but is not limited to such.

In the DAS interrogator 201, a pulse generator 214 may be coupled to a first coupler 210 using an optical fiber 212. The pulse generator 214 may include associated optoelectronics and laser components. The first coupler 210 may be a traditional fused-type fiber optic splitter, a circulator, a PLC fiber optic splitter, or any other type of splitter known to those with ordinary skill in the art having the benefit of this disclosure. In other examples, the first coupler 210 may be a circulator. Optical pulses from the pulse generator 214 may be amplified using optical gain elements, such as any suitable amplification mechanisms including, but not limited to, Erbium Doped Fiber Amplifiers (EDFAs) or Semiconductor Optical Amplifiers (SOAs). The pulse generator 214 may be an SOA operated as a switch.

A second coupler 208 may be coupled to an interferometer 202. The second coupler 208 may split light from an optical fiber 232 into two paths along a top interferometer arm 224 and a bottom interferometer arm 222. In other words, the second coupler 208 may split the backscattered light (e.g., backscattered light 228) from the optical fiber 232 into a first optical path and a second optical path. The first optical path may the top interferometer arm 224. The second optical path may be the bottom interferometer arm 222. Light from the top and bottom interferometer arms 224, 222 is then re-combined at a third coupler 234 to form an interferometric signal. The first, second, and third couplers 210, 208, and 234 may be a traditional fused type fiber optic splitter, a PLC fiber optic splitter, or any other type of splitter known to those with ordinary skill in the art having the benefit of this disclosure.

The interferometer 202 may be used to determine the relative phase shift variations between the light in the top interferometer arm 224 and the bottom interferometer arm 222. This relative phase is impacted by perturbations of the sensing fiber 226 because the delay in propagation times between the two interferometer arms means that light from two different backscatter locations along sensing 226 arrives at the same time at photodetector 220. The spatial separation along the fiber for the origin of the light interfering is determined by the length imbalance of the interferometer arms. This separation is called the gauge length of the measurement and is typically of the order of 1 m to 40 m. The location of the interferometric signal can be determined using time of flight for the optical pulse 216 as is done in Optical Time Domain Reflectometry. The interferometric signal (i.e., the relative phase shift) will vary over the distance of a distributed optical wellbore fiber 226, which in this example includes the optical wellbore fiber cable within the retrievable logging cable 133. In the illustrative example of FIG. 2, the interferometer is a Mach-Zehnder interferometer, but it is not limited to such. For instance, in certain implementations, a Michelson interferometer or any other type of interferometer known to those of skill in the art having the benefit of this disclosure may also be used without departing from the scope of the disclosure.

In the illustrated example, an external fiber stretcher module 224 is interposed between the first coupler 210 and the distributed optical wellbore fiber 226, as shown. Generally, the external fiber stretcher module 224 is an inline, serial module that provides a special area for encoding data or information for a wellbore system such as the wellbore system 100 directly onto the sensing fiber. Specifically, the external fiber stretcher module 224 may be employed to encode auxiliary information related to the seismic source, GPS time information, and current gamma ray logging information for further processing and interpretation.

The interferometer 202 may be coupled to a photodetector assembly 220. The photodetector assembly 220 may include associated optics and signal processing electronics (not shown). The photodetector assembly 220 may be a semiconductor electronic device that uses the photoelectric effect to convert light to electricity. The photodetector assembly 220 may be an avalanche photodiode or a PIN photodiode but is not intended to be limited to such. As the light from the top interferometer arm 224 and the bottom interferometer arm 222 reach the third coupler 234, the photodetector assembly 220 may convert the optical signal (i.e., the interferometric signal) to an electronic signal related to the acoustic signal along the distributed optical fiber 226.

The photodetector assembly 220 may be coupled to an information handling system 230. The photodetector assembly 220 and information handling system 230 may be communicatively or mechanically coupled. A first device may be communicatively coupled to a second device if it is connected to the second device through a wired or wireless communication network that permits the transmission of information. The information handling system 230 is located up-hole in the illustrated example, but may be located at a more remote location, as required. The information handling system 230 may also be communicatively or mechanically coupled to the pulse generator 214.

In operation of the DAS interrogator 201, the pulse generator 214 may generate a first optical pulse 216 that is transmitted through the optical fiber 212 to the first coupler 210. In certain implementations, the pulse generator 214 may be a laser. The first coupler 210 may direct the first optical pulse 216 through the optical fiber 226. At least a portion of the optical fiber 226 may be arranged in coils 218. As the first optical pulse 216 travels through the optical fiber 226, imperfections in the optical fiber 226 may cause a portion of the light to be backscattered along the optical fiber 226 due to Rayleigh scattering. The most common "imperfection" is a small variation of the index of refraction of the glass material due to the statistical distribution of density in the liquid glass prior to glass solidification in the optical fiber manufacturing process. Scattered light according to Rayleigh scattering is returned from every point along the optical fiber 226 along the length of the optical fiber 226 and is shown as backscattered light 228 in FIG. 2. This backscatter effect may be referred to as Rayleigh backscatter. The same density fluctuations in the optical fiber 226 may give rise to energy loss due to the scattered light.

The optical fiber 226 may be terminated with a low reflection device (not shown). In certain implementations, the low reflection device (not shown) may be a fiber coiled and tightly bent to violate Snell's law of total internal reflection such that all the remaining energy is sent out of the fiber. In other implementations, the low reflection device (not shown) may be an angle cleaved fiber. In still other implementations, the low reflection device (not shown) may be a coreless optical fiber with high optical attenuation. In still other implementations, the low reflection device (not shown) may be an optical fiber with a larger diameter core (e.g., a multimode fiber when the sensing fiber is a single mode fiber). In still other implementations, the low reflection device (not shown) may be a termination such as the AFL Endlight.

The backscattered light 228 may travel back through the optical fiber 226, until it reaches the second coupler 208. The first coupler 210 may be mechanically coupled to the second coupler 208 on one side by the optical fiber 232 such that the backscattered light 228 may pass from the first coupler 210 to the second coupler 208 through the optical fiber 232. The second coupler 208 may split the backscattered light 228 based on the number of interferometer arms so that one portion of any backscattered light 228 passing through the interferometer 202 travels through the top interferometer arm 224 and another portion travels through the bottom interferometer arm 222. In other words, the second coupler 208 may split the backscattered light from the optical fiber 232 into a first optical path and a second optical path. The first optical path may be the top interferometer arm 224. The second optical path may be the bottom interferometer arm 222. These two portions may be re-combined at the third coupler 234, and at that point, they may generate an interferometric signal. In an interferometric signal, two signals are superimposed from points separated by a distance of L, where L is the difference in length of the top interferometer arm 224 and the bottom interferometer arm 222. As discussed above, the output from the compensating interferometer 202, or the interferometric signal, includes backscattered interfered light from two positions. This interferometric signal may reach the photodetector assembly 220, where it may be converted to an electrical signal. The photodetector assembly 220 may integrate or add up the number of photons received in a given time period. The photodetector assembly 220 may provide output relating to the backscattered light 228 to the information handling system 230. The information handling system 230 may convey the data to a display, store it in computer readable media, or employ it for further processing as a Distributed Acoustic Sensing (DAS) unit to more accurately determine a vertical seismic profile for a wellbore such as the wellbore 101 of FIG. 1.

Figure 3:
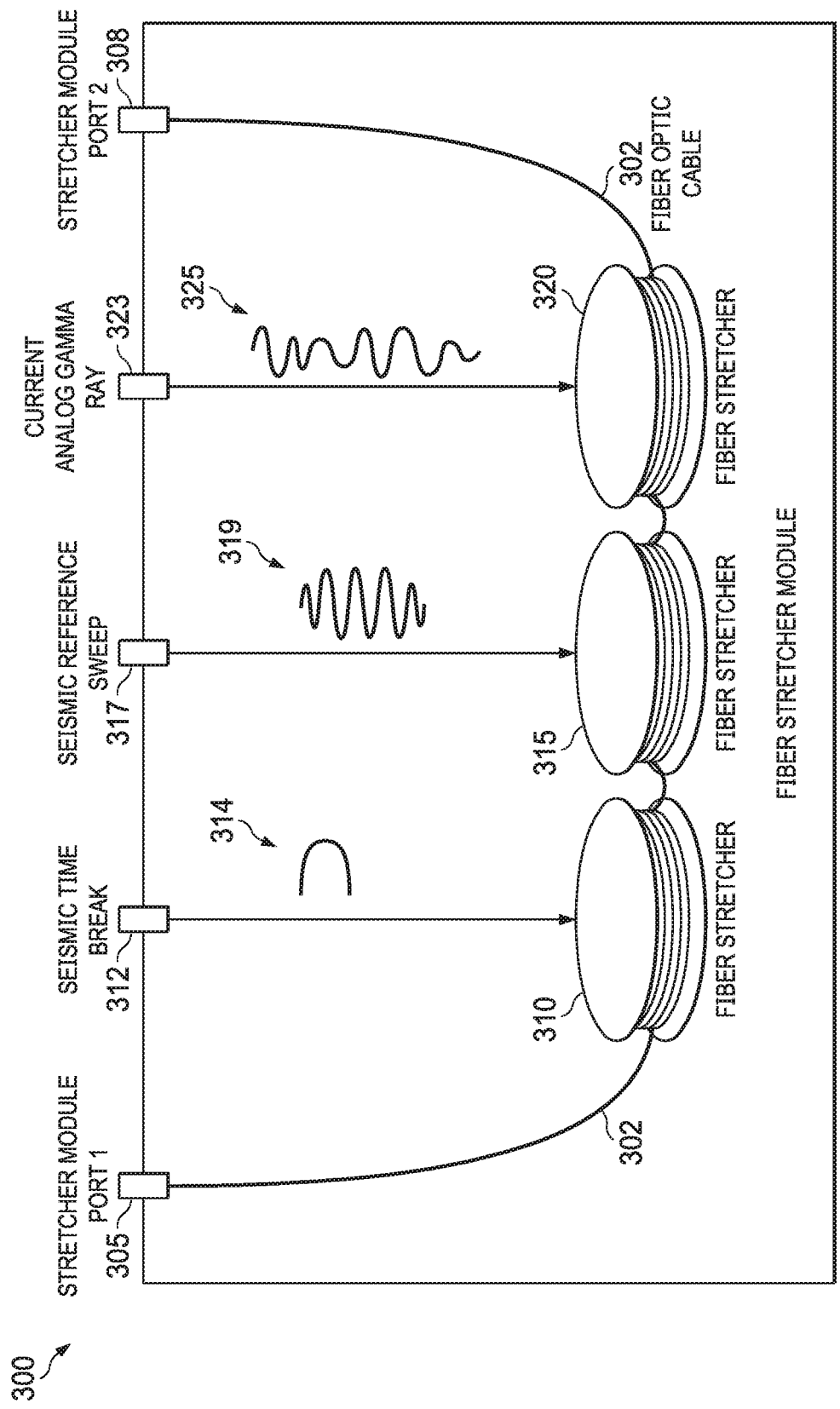
FIG. 3 illustrates an example of a fiber stretcher module constructed according to the principles of the disclosure.

FIG. 3 illustrates an example of a fiber stretcher module, generally designated 300, constructed according to the principles of the disclosure. The fiber stretcher module 300 includes a fiber optic cable 302 having two ports (305 and 308) for input or output of the light. The fiber optic cable 302 is wrapped around and secured to first, second and third mandrels to form first, second and third fiber stretcher assemblies 310, 315, 320, as shown. First, second and third input voltage connectors 312, 317, 323 are respectively connected to the first, second and third fiber stretcher assemblies 310, 315, 320 to apply input voltages corresponding to a seismic time-break 314, a seismic reference sweep 319 and a current gamma ray log 325 to the first, second and third fiber stretcher assemblies 310, 315, 320, respectively. The seismic time-break 314 provides a synchronization signal for starting seismic data acquisition. The seismic reference sweep 319 provides a seismic swept frequency signal proportional to an employed seismic energy source such as the seismic energy source 160 of FIG. 1. The current gamma ray log 325 may additionally provide current gamma ray data or information obtained from a wellbore such as the wellbore 101 of FIG. 1.

The fiber stretcher module 300 does not necessarily need to be external but can also be housed inside a DAS interrogator. In addition, the fiber stretcher module 300 can have an arbitrary number of "input voltage connectors". Aside from a time-zero break signal and a reference sweep signal, possible input signals to the fiber stretcher module include GPS time information, Near-field hydrophone (marine), Far-field hydrophone (marine), miscellaneous timing signals (not used to trigger data acquisition), ground force signal of Vibroseis (used for quality control purposes), etc.

The first, second and third fiber stretcher assemblies 310, 315, 320 form electro-optic devices where a dynamic voltage applied to their portions of the fiber optic cable 302 results in a dynamic mechanical strain along the fiber optic cable 302 thereby causing it to alter its length based on an applied voltage polarity and thereby alter its optical characteristics. The stretcher module input 305 may be connected to the first coupler 210 of the DAS interrogator 201 and the stretcher module output 308 may be connected to the optical fiber 226, for the example of the DAS interrogator 201 in FIG. 2. As noted, the optical fiber 226 of FIG. 2 is representative of a distributed optical wellbore fiber within a retrievable logging cable such as the retrievable logging cable 133 of FIG. 1.

As noted, the fiber stretcher module 300 is an inline, serial module that provides a special area for encoding data or information for a wellbore system such as the wellbore system 100. Generally, the fiber stretcher module 300 can have an arbitrary number of input voltage connectors that provide a consolidation or amalgamation of different signals that are spatially separated along the fiber optic cable 302. In one example, the fiber stretcher module 300 may be employed to encode auxiliary information related to the seismic source and current gamma ray logging information for further processing and interpretation. The fiber stretcher module 300 causes the fiber optic cable 302 to experience mechanical strains based on voltages applied to the terminals 312, 317, 323, which are time break, seismic reference sweep and current gamma ray data signals, respectively. Additionally, mechanical strains are also produced by reflected optical signals on terminal 308 due to seismic wellbore signals applied to the distributed optical wellbore fiber in a retrievable logging cable deployed in a wellbore (e.g., represented by the distributed optical wellbore fiber 226 of FIG. 2). Seismic wellbore signals cause mechanical strains to develop within a distributed optical wellbore fiber in a retrievable logging cable deployed in a wellbore. Those strain variations are detected by the DAS system as explained above in the description of FIG. 2.

Figure 4:
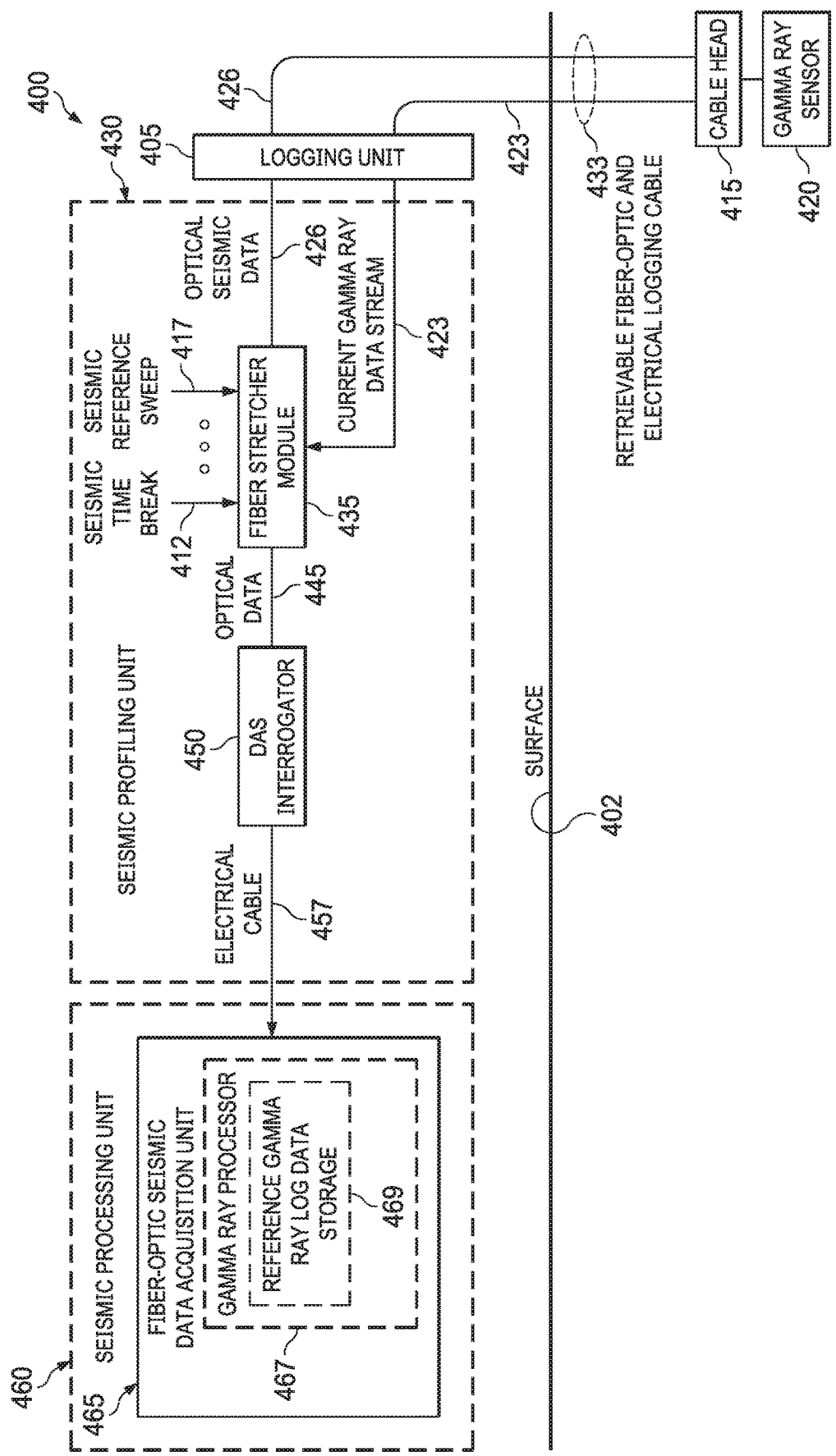
FIG. 4 illustrates an example of a wellbore system constructed according to the principles of the disclosure.

FIG. 4 illustrates an example of a wellbore system, generally designated 400, constructed according to the principles of the disclosure. The wellbore system 400 includes a logging unit 405 positioned at a surface location 402, a retrievable fiber-optic and electrical logging cable 433, a cable head 415 and a gamma ray sensor 420 positioned in a subsurface wellbore of the wellbore system 400. The wellbore system 400 also includes a seismic data profiling unit 430 and a seismic processing unit 460.

The seismic profiling unit 430 includes a fiber stretcher module 435 employing a seismic time break signal 412, a seismic reference sweep signal 417, a current gamma ray data stream 423 and optical seismic wellbore data 426 to provide an amalgamation of optical data 445 to a distributed acoustic sensing (DAS) interrogator 450. The gamma ray data stream 423 and the optical seismic wellbore data 426 originate from a wellbore of the wellbore system 400 and are respectively transmitted to the fiber stretcher module 435 via an electrical portion 423 and an optical portion 426 of the retrievable fiber-optic and electrical logging cable 433. The DAS interrogator 450 provides an electrical signal 457 that corresponds to (and can be proportional to) the optical data 445 to the seismic processing unit 460 for further processing (e.g., from an information handling system such as the information handling system 230 of FIG. 2). The seismic processing unit 460 includes a fiber-optic seismic data acquisition unit 465 having a gamma ray processor 467 that includes reference gamma ray data storage 469 of reference gamma ray logging data.

In one example, the fiber-optic seismic data acquisition unit 465 is an existing fiber-optic vertical seismic profiling data acquisition unit that has been augmented to employ the gamma ray processor 467 and the reference gamma ray log data storage 469. In another example, the fiber-optic seismic data acquisition unit 465 is a new design that includes the gamma ray processing and reference gamma ray log data storage as portions 467, 469. In either case, the gamma ray processor 467 employs the current gamma ray data stream 423 and the stored reference gamma ray log data to correlate the current position of the gamma tool with the corresponding depth assigned in the reference gamma ray log. This can be done because the gamma emissions from the formations remain substantially the same over the life of a well.

Figure 5:
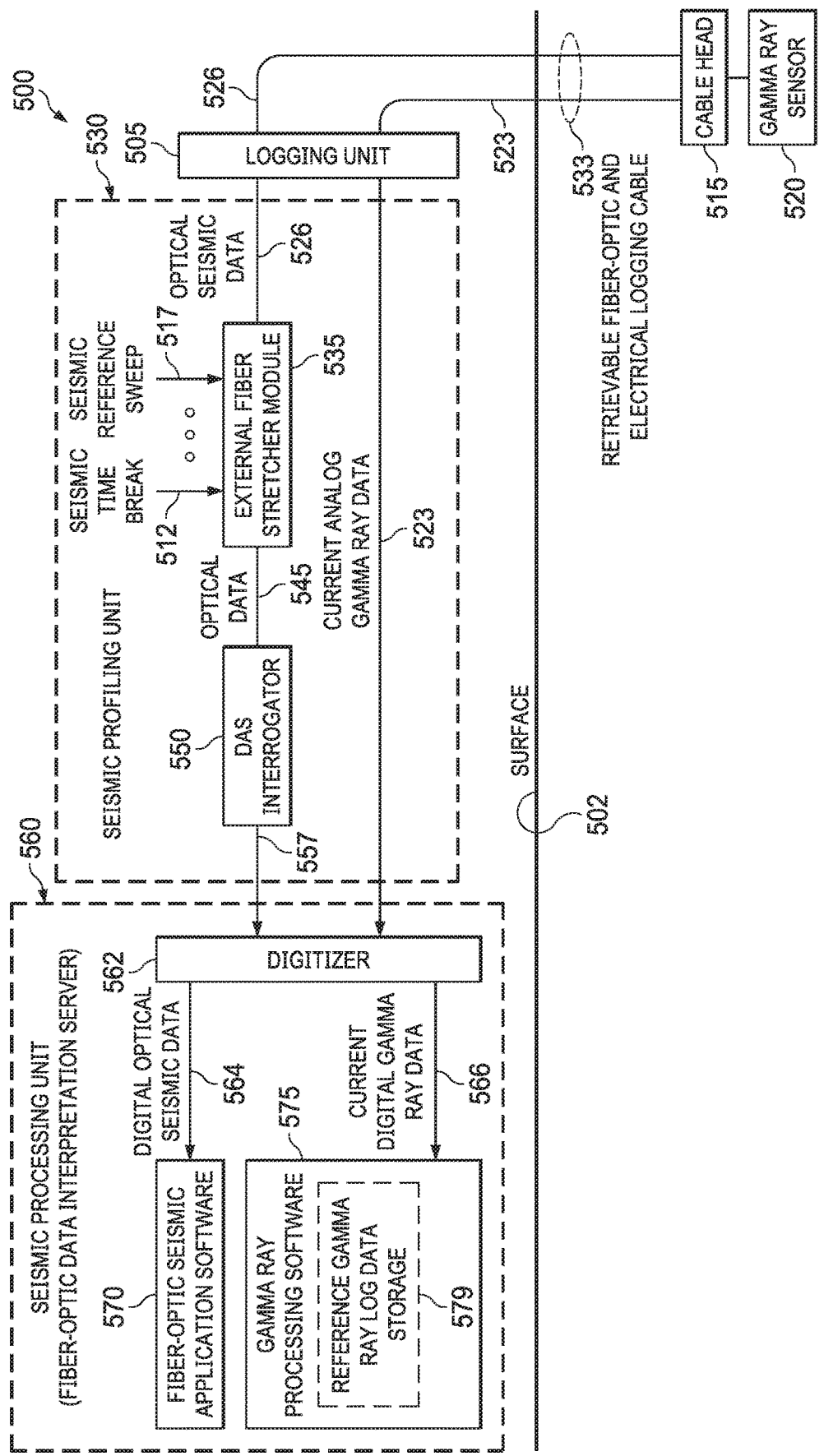
FIG. 5 illustrates another example of a wellbore system constructed according to the principles of the disclosure.

FIG. 5 illustrates another example of a wellbore system, generally designated 500, constructed according to the principles of the disclosure. The wellbore system 500 includes a logging unit 505 positioned at a surface location 502, a retrievable fiber-optic and electrical logging cable 533, a cable head 515 and a gamma ray sensor 520 positioned in a subsurface wellbore of the wellbore system 500. The wellbore system 500 also includes a seismic profiling unit 530 and a seismic processing unit 560.

The seismic profiling unit 530 includes a fiber stretcher module 535 employing a seismic time break signal 512, a seismic reference sweep signal 517 and optical seismic wellbore data 526 to provide another amalgamation of optical data 545 to a distributed acoustic sensing (DAS) interrogator 550. A gamma ray data stream 523 and the optical seismic wellbore data 526 originate from the subsurface wellbore of the wellbore system 500 and are respectively transmitted up-hole via an electrical cable portion 523 and an optical cable portion 526 of the retrievable fiber-optic and electrical logging cable 533. The DAS interrogator 550 provides an electrical signal 557 that corresponds to (and can be proportional to) the amalgamation of optical data 545 to the seismic processing unit 560 for further processing (e.g., from an information handling system such as the information handling system 230 of FIG. 2). Although not shown, electronic components within seismic profiling unit 530 may be used to convert the gamma tool electrical analog signal from logging unit 505 shown in line 532 to a form suitable for input into digitizer 562 of seismic processing unit 560. If no signal processing is needed on signal 523, the signal connection may also completely bypass seismic profiling unit 530 and connect directly to seismic processing unit 560.

The seismic processing unit 560 includes a digitizer 562 that digitizes the electrical signal 557 to provide digital optical seismic data 564 to fiber-optic seismic application software 570 contained in, for example, a fiber-optic data acquisition server within the seismic processing unit 560 (not explicitly shown). For example, digitizer 562 may include an Analog-to-Digital Converter (ADC) able to convert four analog channels at a rate of 100 MHz per channel. Such a digitizer would enable a spatial resolution of 1 m in the acquisition of the DAS signal. The digitizer 562 shown here additionally digitizes the current analog gamma ray data 523 to provide current digital gamma ray data 566 to gamma ray processing software 575 also contained in seismic processing unit 560. It should be noted that although they are utilizing the same system for acquisition and storage, the seismic DAS signal will generally be obtained when the wireline is stationary, whereas the gamma tool signal (or more generally, signals from the depth correlation unit 120) will can be recorded when the wireline is in motion or at rest. For example, the gamma tool signal (or more generally, signals from the depth correlation unit 120) is often recorded with the tool moving in the wellbore toward the surface, traversing the various formations or, in the case of casing collar locator, while passing next to casing collar locations. The gamma ray processing software 575 has access to storage of reference gamma ray data 579 for processing and analysis purposes.

Generally, the gamma ray processing software 575 is employed to determine an offset distance between the current gamma ray log of a formation reference region within a wellbore of the wellbore system 500 and a previous reference gamma ray log of the formation reference region within the wellbore. Determination of this offset distance and its communication to the fiber optic seismic application software 570 allows improved accuracy and precision in positioning of distributed acoustic (seismic) sensing channels within the wellbore.

Figure 6:
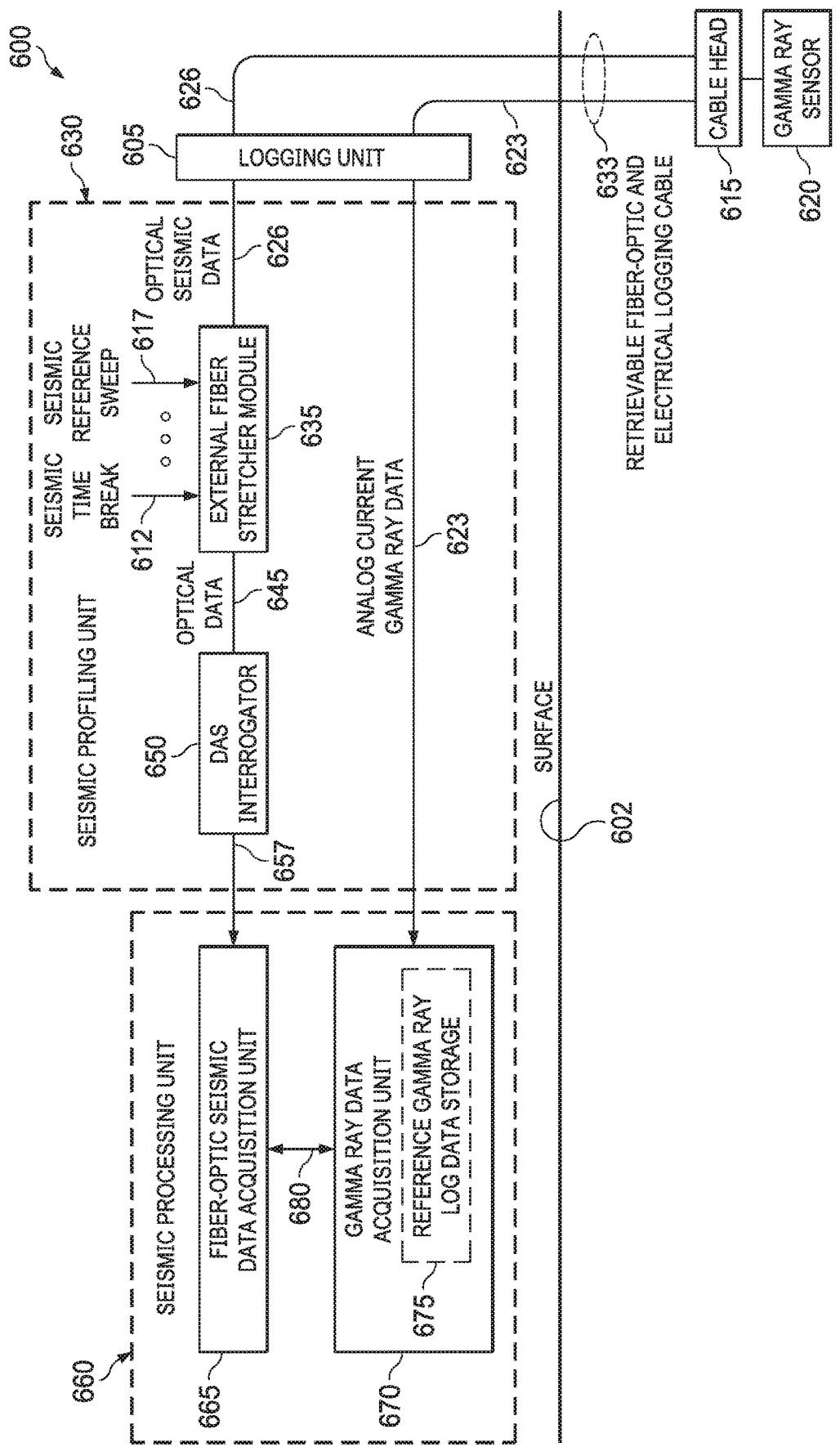
FIG. 6 illustrates yet another example of a wellbore system constructed according to the principles of the disclosure.

FIG. 6 illustrates yet another example of a wellbore system, generally designated 600, constructed according to the principles of the disclosure. The wellbore system 600 includes a logging unit 605 positioned at a surface location 602, a retrievable fiber-optic and electrical logging cable 633, a cable head 615 and a gamma ray sensor 620 positioned in a subsurface wellbore of the wellbore system 600. The wellbore system 600 also includes a seismic profiling unit 630 and a seismic processing unit 660.

Parallel to the discussion of FIG. 5, the seismic profiling unit 630 includes a fiber stretcher module 635 employing a seismic time break signal 612, a seismic reference sweep signal 617 and optical seismic wellbore data 626 to provide a corresponding amalgamation of optical data 645 to a distributed acoustic sensing (DAS) interrogator 650. A gamma ray data stream 623 and the optical seismic wellbore data 626 originate from a subsurface wellbore of the wellbore system 600 and are respectively transmitted up-hole via an electrical cable portion 623 and an optical cable portion 626 of the retrievable fiber-optic and electrical logging cable 633. The DAS interrogator 650 provides an electrical signal 657 that is corresponds to (and can be proportional to) the amalgamation of optical data 645 to the seismic processing unit 660 for further processing (e.g., from an information handling system such as the information handling system 230 of FIG. 2).

The seismic processing unit 660 includes a fiber optic seismic data acquisition unit 665 and a gamma ray data acquisition unit 670 having access to storage of reference gamma ray log data 675, as shown. A processing pathway 680 provides for interfacing between the fiber optic seismic data acquisition unit 665 and the gamma ray data acquisition unit 670, as needed. Because the signals from the gamma ray sensor operate at a much lower frequency compared to the 100 MHz acquisition rate of the fiber optic signal, the configuration of FIG. 6 enables preserving the faster channels of a high speed digitizer of fiber-optic seismic data acquisition unit 665 for DAS signals while using a lower-cost, slower digitizer for the signals of the gamma ray sensor in gamma-ray data acquisition units. For example, output from the gamma ray sensor (or other depth correlation unit 120) can be collected using a 10 kHz digitizer. Generally, the gamma ray data acquisition unit 670 is employed to enable the consistent assignment of the depth of the gamma ray sensor relative to a previous reference gamma ray log of the formation reference region within the same wellbore. Knowing the depth of the gamma ray sensor 120 relative to the reference enables us to know the depth of the logging cable 133 in relation to the same reference log. Generally, the position of the end of the logging cable is also accurately known within the DAS signal. In other words, a specific DAS channel (time slot) can be assigned to the end of the logging cable. In some applications, the relative depth of the other channels along the logging cable may not be easily mapped due to the multiple factors affecting the local stretch of the cable and the index of refraction of the optical fiber. The principles disclosed herein can be employed to assist in this mapping.

FIGS. 7(*a*), 7(*b*) illustrate examples of wellbore formations, generally designated 700, 750, as representative of a subsurface structure that may be employed for analysis in examples of the disclosure. The wellbore formations 700, 750 include a wellbore 701 drilled from a surface 702 and having first and second wellbore formations 705 and 707, a retrievable fiber-optic and electrical logging cable 733, a downhole tool 710 containing a gamma ray sensor 712 that provides a reference gamma ray log 715.

Figure 7A:
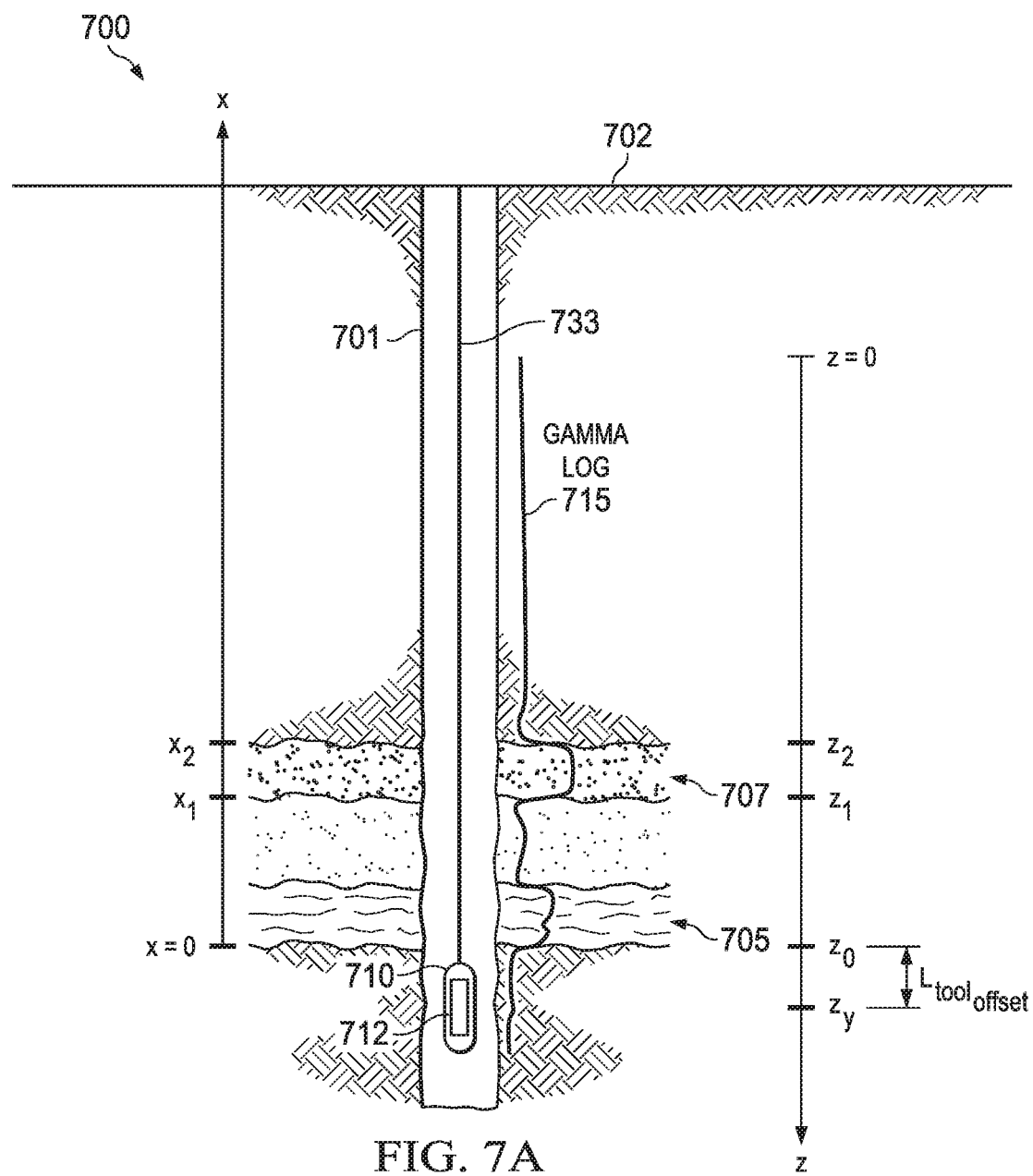
FIGS. 7A, 7B illustrate examples of wellbore formations as representative of a subsurface structure that may be employed for analysis in examples of the disclosure.
Figure 7B:
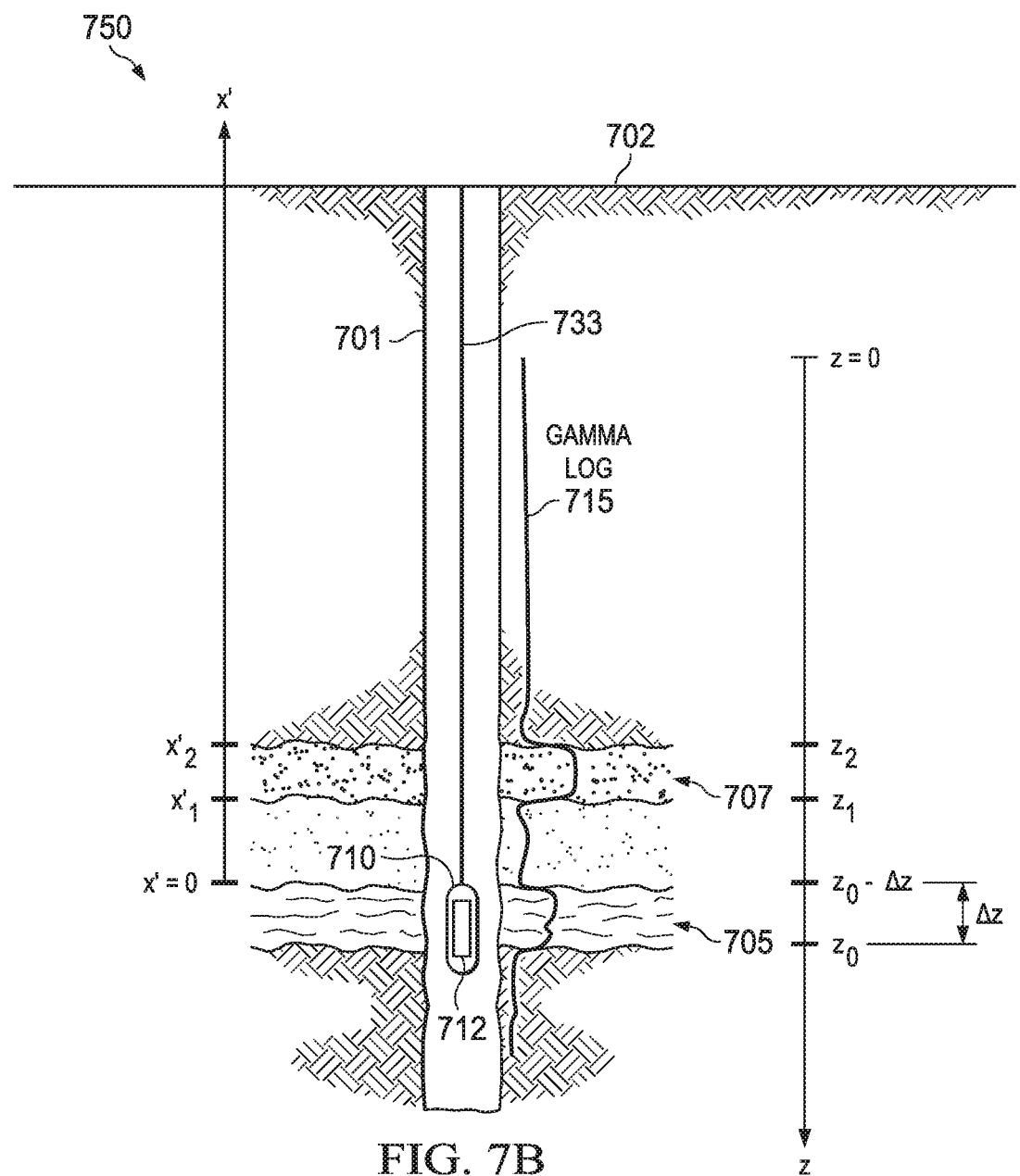

Referring to FIGS. 7(*a*) and 7(*b*), the gamma ray sensor 712 is lowered with the downhole tool 710 to a depth correlated to the reference gamma ray log 715 and known now to be $z_\gamma$. By design, the position of the end of logging cable 733 relative to the gamma ray sensor 712 is known and therefore a depth $z_0$ can be assigned to the end of the logging cable 733 according to, for example, $z_0 = z_\gamma - L_{tool_{offset}}$ where $L_{tool_{offset}}$ is the fixed spacing between the gamma ray sensor 712 and the end of logging cable 733. FIGS. 7a, 7b illustrate the two coordinate systems that are correlated. The "z" coordinates refer to the depth reference system, the reference gamma ray log 715, that is the desired coordinates for all of the measurements and in which the position of the end of logging cable 733 is labeled as $z_0$. The values of z increase with depth. The "x" coordinate system refers to the depths assigned to DAS signals, referenced to the end of the logging cable 733, meaning that x=0 where $z=z_0$ and with values of x increasing as depth decreases. The depthing problem consists of assigning z-values (depths in the reference coordinate system which is the reference gamma ray log 715) to the x-values (DAS signal positions). The following relation can be used as a starting point:

$$z(x) = z_0 - \alpha x_1 - \beta x_1^2 \qquad (1)$$

where $z_0$ is an offset, and $\alpha$ and $\beta$ are scaling parameters.

To improve the accuracy of estimates of $\alpha$ and of $\beta$ a first VSP DAS signal can be obtained with the gamma ray sensor 712 at depth $z_\gamma$, meaning that the end of logging cable 733 is at depth $z_0$ which can be determined by the above equation, $z_0 = z_\gamma - L_{tool_{offset}}$. This fiber VSP profile will contain features due to the fixed sequence of rock formations within the wellbore 701. In one example, the profile can be a FiberVSP™ profile provided by Halliburton Energy Services of Houston, Tex. At least two features are used for correlation and these are observed at positions $x_1$ and $x_2$ in the fiber VSP log, with $x_1 < x_2$. Therefore, using the equation above, the following may be obtained:

$$z_1 = z_0 - \alpha x_1 - \beta x_1^2 \qquad (2)$$

and $$z_2 = z_0 - \alpha x_2 - \beta x_2^2 \qquad (3)$$

As illustrated in FIG. 7B, the gamma ray sensor 712 is then moved upward by a length $\Delta z$ as determined by the new position of the gamma ray sensor 712 $z'_\gamma = z_\gamma - \Delta z$ and a second fiber VSP log is obtained. Note that both $z'_\gamma$ and $z_\gamma$ are values assigned based on the correction of the output of the gamma ray sensor 712 to the reference gamma ray log 715. Hence, $\Delta z$ is close to but not necessarily equal to the depth difference as determined using a wireline depth counter associated with the logging cable 733. To employ the method described here, $\Delta z < \alpha x_1$ so that the same two features are present in both the first fiber VSP log (from FIG. 7A) and the second fiber VSP log (from FIG. 7B). In the second log, the features are observed at positions $x'_1$ and $x'_2$. Since these two features are the same as before and have moved in the wellbore, their "z" values should map to the same locations as before resulting in:

$$z_1 = z_0 - \Delta z - \alpha' x'_1 - \beta' x'^2_1 \qquad (4)$$

and $$z_2 = z_0 - \Delta z - \alpha' x'_2 - \beta' x'^2_2 \qquad (5)$$

Note that, in the general case, it cannot be assumed that the mapping along the optical fiber of the logging cable 733 has remained the same—for example, the load on the logging cable 733 may have changed between the two locations—so new coefficients $\alpha'$ and $\beta'$ can be assigned to the second fiber VSP log. Accordingly, the following assumptions can be used:

$$\alpha' = \alpha \qquad (6)$$

and $$\beta' = \beta \qquad (7)$$

This happens when friction affecting the cable strain profile is negligible, for example. With this assumption, the following is obtained:

$$z_1 = z_0 - \Delta z - \alpha x'_1 - \beta x'^2_1 \qquad (8)$$

and $$z_2 = z_0 - \Delta z - \alpha x'_2 - \beta x'^2_2 \qquad (9)$$

Equations (2), (3), (8) and (9) are four equations enabling the determination of the four unknowns $\alpha$, $\beta$, $z_1$ nd $z_2$. In particular:

$$\beta = \frac{\Delta z}{(x_1^2 - x_1'^2)} \frac{(x_1 + x'_1)}{(x_2 - x'_2)} \frac{((x_1 - x'_1) - (x_2 - x'_2))}{((x_2 + x'_2) - (x_1 + x'_1))}$$

and $$\alpha = \frac{\Delta z - \beta(x_1^2 - x_1'^2)}{(x_1 - x'_1)}$$

Eq. (10) substitutes in Eq. (11), and this results, along with Eq. (10) are substituted in Eq. (2) and (3) to find $z_1$ and $z_2$. Additional scaling parameters can also be employed for determining correlated positions of the gamma ray sensor 712, for example, when Eqs (6) and (7) are not valid. The scaling parameters can be a function of downhole measurements of temperature T and tension F by use of a scaling function $f(T, F)$, determined from prior measurements on the logging cable 733 that estimates the effect of these scaling parameters on the response of the optical fiber of the logging cable 733. The following could then be written instead of Equation (1):

$$z(x) = z_0 - \alpha \cdot f(T,F) \cdot x - \beta \cdot (f(T,F) \cdot x) \qquad (12)$$

Since $f(T, F)$ can be a known, this formulation does not add more unknowns and the problem is solvable from a system of four equations and four unknowns, as before, since its derivation is similar to the one just demonstrated.

Figure 8:
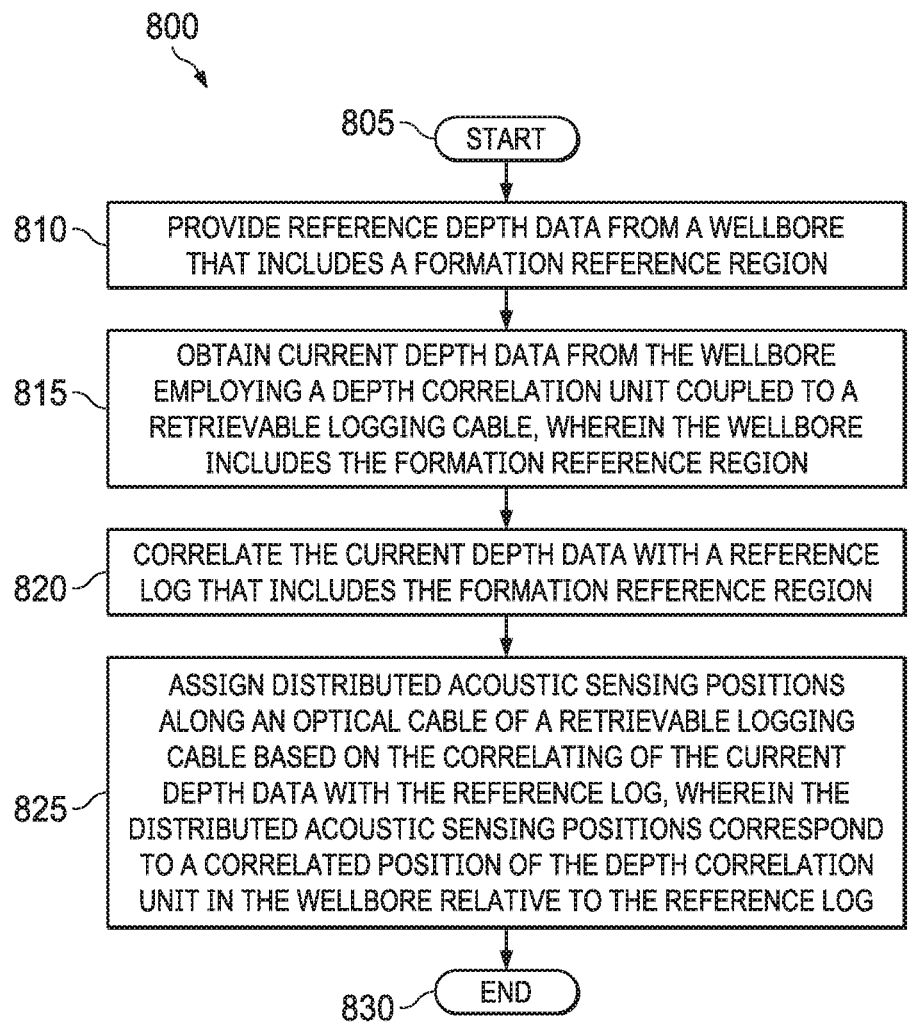
FIG. 8 illustrates a flow diagram of an example of a distributed acoustic sensing method carried out according to the principles of the disclosure.

FIG. 8 illustrates a flow diagram of an example of a distributed acoustic sensing method, generally designated 800, carried out according to the principles of the disclosure. The method 800 starts in a step 805 and then reference depth data is provided from a wellbore that includes a formation reference region, in a step 810. Current depth data is obtained from the wellbore employing a depth correlation unit coupled to a retrievable logging cable, wherein the wellbore includes a formation reference region, in a step 815. The current depth data is correlated with a reference log that includes the formation reference region, in a step 820. Distributed acoustic sensing positions are assigned along an optical cable of the retrievable logging cable based on the correlating of the current depth data with the reference log, wherein the distributed acoustic sensing positions correspond to a correlated position of the depth correlation unit in the wellbore relative to the reference log, in a step 825.

In one example, the retrievable logging cable includes wellbore fiber-optic and electrical logging cables to convey the wellbore data up-hole. In another example, the distributed acoustic sensing channels provide seismic profiling of the wellbore through a distributed acoustic sensing interrogator and a fiber stretcher module. The input signals of the fiber stretcher module include but are not limited to input signals corresponding to a seismic time break, a seismic reference sweep and a vertical seismic profile of the wellbore along the optical cable to provide an optical output signal corresponding to a data amalgamation of the input signals for the seismic profiling of the wellbore. The input signals of the fiber stretcher module further include an input gamma ray data stream corresponding to a current gamma ray log. The distributed acoustic sensing interrogator receives the optical output signal from the fiber stretcher module and provides a corresponding electrical output signal for seismic processing.

In another example, the seismic processing includes fiber optic seismic data acquisition of a data amalgamation of the input signals corresponding to a seismic time break, a seismic reference sweep, a vertical seismic profile of the wellbore, and a separate input data stream corresponding to the current gamma ray log. In a further example, the seismic processing includes data acquisition software for processing a digitation of a data amalgamation of external fiber stretcher module input signals including input signals corresponding to a seismic time break, a seismic reference sweep and a vertical seismic profile of the wellbore and gamma ray processing software for processing a digitation of a separate input data stream corresponding to a current gamma ray log with respect to a reference gamma ray log. In a still further example, the seismic processing includes a fiber optic data acquisition of a data amalgamation of input signals corresponding to: a seismic time break, a seismic reference sweep, a vertical seismic profile of the wellbore. The seismic processing can also include a separate gamma ray data acquisition corresponding to a current gamma ray log with respect to a reference gamma ray log. Mutual communication through a processing pathway between the fiber optic data acquisition and the separate gamma ray data acquisition can be employed.

At least two different depths of the depth correlation unit within the wellbore are employed to determine correlated positions. Scaling parameters can also be employed to determine the correlated positions. The method 800 ends in a step 830.

A portion of the above-described apparatus, systems or methods may be embodied in or performed by various digital data processors, wherein the processors are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

While the method disclosed herein has been described and shown with reference to particular steps performed in a particular order, it will be understood that these steps may be combined, subdivided, or reordered to form an equivalent method without departing from the teachings of the disclosure. Accordingly, unless specifically indicated herein, the order or the grouping of the steps is not a limitation of the disclosure.

Those skilled in the art to which this application relates will appreciate that other and further additions, deletions, substitutions and modifications may be made to the described embodiments.

Various aspects of the disclosure can be claimed including the apparatuses, systems, and methods as disclosed herein. Aspects disclosed herein include:

A. A wellbore system, including: (1) a logging unit having a retrievable logging cable coupled to a downhole tool within a wellbore, wherein the retrievable logging cable comprises an optical cable; and (2) a depth correlation unit in the downhole tool having a known position relative to a downhole end of the retrievable logging cable and providing a signal that correlates a position of the depth correlation unit to a depth recorded in a reference log, wherein distributed acoustic sensing positions are assigned along the optical cable that correspond to correlated positions of the depth correlation unit in the wellbore relative to the reference log.

B. A distributed acoustic sensing method, including (1) obtaining current depth data from a wellbore employing a depth correlation unit coupled to a retrievable logging cable, wherein the wellbore includes a formation reference region; (2) correlating the current depth data with a reference log that includes the formation reference region; and (3) assigning distributed acoustic sensing positions along an optical cable of the retrievable logging cable based on the correlating of the current depth data with the reference log, wherein the distributed acoustic sensing positions correspond to correlated positions of the depth correlation unit in the wellbore relative to the reference log.

Each of aspects A and B can have one or more of the following additional elements in combination:

Element 1: further comprising a seismic profiling unit that includes a fiber stretcher module connected to a sensing fiber and that employs configured to employ input signals corresponding to a seismic time break and a seismic reference sweep that are added as additional sensing inputs along the optical cable. Element 2: wherein the input signals further include current gamma ray data. Element 3: wherein the input signals further include a current casing collar locator data. Element 4: wherein at least two different depths of the depth correlation unit within the wellbore are employed to determine correlated positions of the depth correlation unit. Element 5: wherein scaling parameters are further employed to determine the correlated positions. Element 6: wherein data amalgamation of the input signals from the fiber stretcher module is processed using substantially real time data. Element 7: further comprising a seismic processing unit wherein an output signal corresponding to data amalgamation of input signals is applied to an input of the seismic processing unit. Element 8: further comprising a seismic processing unit that includes a fiber optic seismic data acquisition unit having a gamma ray processor with access to storage of a previous reference gamma ray log of a formation reference region within the wellbore. Element 9: further comprising a seismic processing unit that seismic processing unit includes a fiber optic data acquisition server having fiber optic seismic application software and gamma ray processing software with access to storage of a reference gamma ray logging data of a formation reference region within the wellbore. Element 10: further comprising a seismic processing unit that seismic processing unit includes a fiber optic seismic data acquisition unit having a processing pathway coupled to a gamma ray data acquisition unit, the gamma ray data acquisition unit having access to storage of reference gamma ray logging data of a formation reference region within the wellbore. Element 11: wherein the retrievable logging cable includes wellbore fiber-optic and electrical logging cables to convey the wellbore data up-hole. Element 12: wherein the distributed acoustic sensing positions provide seismic profiling of the wellbore through a distributed acoustic sensing interrogator and a fiber stretcher module. Element 13: wherein the distributed acoustic sensing interrogator receives an optical output signal from the fiber stretcher module and provides a corresponding electrical output signal for seismic processing. Element 14: wherein at least two different depths of the depth correlation unit within the wellbore are employed to determine correlated positions of the depth correlation unit. Element 15: wherein scaling parameters are further employed to determine the correlated positions. Element 16: wherein the seismic processing includes fiber optic seismic data acquisition of a data amalgamation of input signals corresponding to a seismic time break, a seismic reference sweep, a vertical seismic profile of the wellbore and a separate input data stream corresponding to a the current gamma ray log. Element 17: wherein the seismic processing includes data acquisition software for processing a digitation of a data amalgamation of fiber stretcher module input signals including input signals corresponding to a seismic time break, a seismic reference sweep and a vertical seismic profile of the wellbore, and gamma ray processing software for processing a digitation of a separate input data stream corresponding to a current gamma ray log with respect to a reference gamma ray log. Element 18: wherein the seismic processing includes a fiber optic data acquisition of a data amalgamation of input signals corresponding to a seismic time break, a seismic reference sweep and a vertical seismic profile of the wellbore, and a separate gamma ray data acquisition corresponding to a current gamma ray log with respect to a reference gamma ray log.

Those skilled in the art to which this application relates will appreciate that other and further additions, deletions, substitutions and modifications may be made to the described embodiments.

What is claimed is:

1. A wellbore system, comprising:
a logging unit having a retrievable logging cable coupled to a downhole tool within a wellbore, wherein the retrievable logging cable comprises an optical cable; and
a depth correlation unit in the downhole tool having a known position relative to a downhole end of the retrievable logging cable and providing a signal that correlates a position of the depth correlation unit to a depth recorded in a reference log, wherein distributed acoustic sensing positions are assigned along the optical cable that correspond to correlated positions of the depth correlation unit in the wellbore relative to the reference log.

2. The system as recited in claim 1, further comprising a seismic profiling unit that includes a fiber stretcher module connected to a sensing fiber and that employs input signals corresponding to a seismic time break and a seismic reference sweep that are added as additional sensing inputs along the optical cable.

3. The system as recited in claim 2, wherein the input signals further include current gamma ray data.

4. The system as recited in claim 2, wherein the input signals further include a current casing collar locator data.

5. The system as recited in claim 2, wherein data amalgamation of the input signals from the fiber stretcher module is processed using substantially real time data.

6. The system as recited in claim 2, further comprising a seismic processing unit, wherein an output signal corresponding to data amalgamation of the input signals is applied to an input of the seismic processing unit.

7. The system as recited in claim 1, further comprising a seismic processing unit that includes a fiber optic seismic data acquisition unit having a gamma ray processor with access to storage of a previous reference gamma ray log of a formation reference region within the wellbore.

8. The system as recited in claim 1, further comprising a seismic processing unit that includes a fiber optic data acquisition server having fiber optic seismic application software and gamma ray processing software with access to storage of a reference gamma ray logging data of a formation reference region within the wellbore.

9. The system as recited in claim 1, further comprising a seismic processing unit that includes a fiber optic seismic data acquisition unit having a processing pathway coupled to a gamma ray data acquisition unit, the gamma ray data acquisition unit having access to storage of reference gamma ray logging data of a formation reference region within the wellbore.

10. The system as recited in claim 1, wherein at least two different depths of the depth correlation unit within the wellbore are employed to determine correlated positions of the depth correlation unit.

11. The system as recited in claim 10, wherein scaling parameters are further employed to determine the correlated positions.

12. A distributed acoustic sensing method, comprising:
obtaining current depth data from a wellbore employing a depth correlation unit coupled to a retrievable logging cable, wherein the wellbore includes a formation reference region;
correlating the current depth data with a reference log that includes the formation reference region; and
assigning distributed acoustic sensing positions along an optical cable of the retrievable logging cable based on the correlating of the current depth data with the reference log, wherein the distributed acoustic sensing positions correspond to correlated positions of the depth correlation unit in the wellbore relative to the reference log.

13. The method as recited in claim 12 wherein the retrievable logging cable includes wellbore fiber-optic and electrical logging cables to convey wellbore data up-hole.

14. The method as recited in claim 12 wherein the distributed acoustic sensing positions provide seismic profiling of the wellbore through a distributed acoustic sensing interrogator and a fiber stretcher module.

15. The method as recited in claim 14, wherein the distributed acoustic sensing interrogator receives an optical output signal from the fiber stretcher module and provides a corresponding electrical output signal for seismic processing.

16. The method as recited in claim 12, wherein seismic processing includes fiber optic seismic data acquisition of a data amalgamation of input signals corresponding to a seismic time break, a seismic reference sweep, a vertical seismic profile of the wellbore and a separate input data stream corresponding to a current gamma ray log.

17. The method as recited in claim 12, wherein seismic processing includes data acquisition software for processing a digitation of a data amalgamation of fiber stretcher module input signals including input signals corresponding to a seismic time break, a seismic reference sweep and a vertical seismic profile of the wellbore, and gamma ray processing software for processing a digitation of a separate input data stream corresponding to a current gamma ray log with respect to a reference gamma ray log.

18. The method as recited in claim 12, wherein seismic processing includes a fiber optic data acquisition of a data amalgamation of input signals corresponding to a seismic time break, a seismic reference sweep and a vertical seismic profile of the wellbore, and a separate gamma ray data acquisition corresponding to a current gamma ray log with respect to a reference gamma ray log.

19. The method as recited in claim 12, wherein at least two different depths of the depth correlation unit within the wellbore are employed to determine correlated positions of the depth correlation unit.

20. The method as recited in claim 19, wherein scaling parameters are further employed to determine the correlated positions.

* * * * *